United States Patent
Swaminathan et al.

(10) Patent No.: US 11,314,970 B1
(45) Date of Patent: Apr. 26, 2022

(54) REINFORCEMENT LEARNING TECHNIQUES FOR AUTOMATED VIDEO SUMMARIZATION

(71) Applicant: Adobe Inc., San Jose, CA (US)

(72) Inventors: Viswanathan Swaminathan, Saratoga, CA (US); Stefano Petrangeli, Mountain View, CA (US); Hongxiang Gu, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/953,049

(22) Filed: Nov. 19, 2020

(51) Int. Cl.
G06K 9/00 (2006.01)
G06N 3/08 (2006.01)
G11B 27/031 (2006.01)
G06K 9/62 (2022.01)
G11B 27/06 (2006.01)

(52) U.S. Cl.
CPC ..... G06K 9/00751 (2013.01); G06K 9/00718 (2013.01); G06K 9/00758 (2013.01); G06K 9/6256 (2013.01); G06N 3/08 (2013.01); G11B 27/031 (2013.01); G11B 27/06 (2013.01)

(58) Field of Classification Search
CPC .................................................. G06K 9/00751
See application file for complete search history.

(56) References Cited

U.S. PATENT DOCUMENTS

| | | | | |
|---|---|---|---|---|
| 2006/0165379 A1* | 7/2006 | Agnihotri | ............... | H04N 21/84 386/231 |
| 2010/0104261 A1* | 4/2010 | Liu | ........................ | G11B 27/34 386/241 |
| 2013/0259390 A1* | 10/2013 | Dunlop | .............. | G06K 9/00751 382/224 |
| 2015/0318020 A1* | 11/2015 | Pribula | ................ | H04N 9/8205 386/227 |
| 2016/0034786 A1* | 2/2016 | Suri | ..................... | G06K 9/6256 382/159 |
| 2018/0121733 A1* | 5/2018 | Joshi | .................. | G06K 9/00744 |

(Continued)

OTHER PUBLICATIONS

Avila et al., VSUMM: An Approach for Automatic Video Summarization and Quantitative Evaluation, XXI Brazilian Symposium on Computer Graphics and Image Processing IEEE, 2008, pp. 103-110.

(Continued)

Primary Examiner — Daniel T Tekle
(74) Attorney, Agent, or Firm — Kilpatrick Townsend & Stockton LLP

(57) ABSTRACT

A video summarization system generates a concatenated feature set by combining a feature set of a candidate video shot and a summarization feature set. Based on the concatenated feature set, the video summarization system calculates multiple action options of a reward function included in a trained reinforcement learning module. The video summarization system determines a reward outcome included in the multiple action options. The video summarization system modifies the summarization feature set to include the feature set of the candidate video shot by applying a particular modification indicated by the reward outcome. The video summarization system identifies video frames associated with the modified summarization feature set, and generates a summary video based on the identified video frames.

20 Claims, 6 Drawing Sheets

(56) References Cited

U.S. PATENT DOCUMENTS

| | | | |
|---|---|---|---|
| 2019/0294729 A1* | 9/2019 | Jiang | G06K 9/00718 |
| 2020/0302294 A1* | 9/2020 | Kadav | G06N 3/08 |
| 2021/0011941 A1* | 1/2021 | Liu | G06F 40/30 |
| 2021/0082170 A1* | 3/2021 | Chentanez | G06N 3/08 |

OTHER PUBLICATIONS

Aytar et al., Soundnet: Learning Sound Representations fromUnlabeled Video, In Advances in Neural Information Processing Systems, 2016, pp. 892-900.

Chen et al., Weakly Supervised Video Summarization by Hierarchical Reinforcement Learning, In Proceedings of the ACM Multimedia Asia, 2019, pp. 1-6.

Deng et al., Imagenet: A Large-scale Hierarchical Image Database, In 2009 IEEE Conference on Computer Vision and Pattern Recognition, 2009, pp. 248-255.

Furini et al., STIMO: Still and Moving Video Storyboard for the Web Scenario, Multimedia Tools and Applications, vol. 46, No. 1, 2010, p. 47.

Gu et al., From Thumbnails to Summaries—a Single Deep Neural Netw ork to Rule Them All, IEEE International Conference on Multimedia and Expo (ICME), 2018, pp. 1-6.

Gunawardena et al., Real-time Automated Video Highlight Generation w ith Dual-streamHierarchical Grow ing Self-Organizing Maps, In Journal of Real-Time Image Processing, 2020.

Jiao et al., Video Highlight Detection via Region-based Deep Ranking Model, In International Journal of Pattern Recognition and Artificial Intelligence, vol. 33, No. 7, 2019.

Jung et al., Discriminative Feature Learning for Unsupervised Video Summarization, Proceedings of the AAAI Conference on Artificial Intelligence, vol. 33, 2019, pp. 8537-8544.

Kim et al., Exploiting Web Images for Video Highlight Detection with Triplet Deep Ranking, IEEE Transactions on Multimedia, vol. 20, No. 9, 2018, pp. 2415-2426.

Krawetz, Difference Hash (Dhash) Algorithm, Available Online at: http://www.hackerfactor.com/blog/index.php?/archives/529-Kind-of-Like-That.html, 2013.

Lan et al., FFNet: Video fast-forw arding via Reinforcement learning, Proceedings of the IEEE Conference on Computer Vision and Pattern Recognition, 2018, pp. 6771-6780.

Mahasseni et al., Unsupervised Video Summarization with Adversarial LSTM Netw orks, Proceedings of the IEEE Conference on Computer Vision and Pattern Recognition, 2017, pp. 202-211.

Mahmoud et al., VSCAN: An Enhanced Video Summarization Using Density-Based Spatial Clustering, International conference on image analysis and processing, Springer, 2013, pp. 733-742.

Mnih et al., Raying AtariWith Deep Reinforcement Learning, In NIPS Workshop, DeepMind Technologies, 2013.

Mundur et al., Keyframe-based Video Summarization Using Delaunay Clustering, International Journal on Digital Libraries 6.2, 2006, pp. 219-232.

Ng, Reinforcement Learning and Control, Available Online at: http://cs229.stanford.edu/notes/cs229-notes12.pdf.

Secareanu, Football Events, Available Online at: http://https://www.kaggle.com/secareanualin/football-events.

Szegedy et al., Rethinking the Inception Architecture for Computer Vision, In Proceedings of the IEEE conference on Computer vision and Pattern Recognition, 2016, pp. 2818-2826.

Wang et al., Unsupervised Reinforcement Learning for Video Summarization Rew ard Function, In Proceedings of the 2019 International Conference on Image, Video and Signal Processing, 2019, pp. 40-44.

Wulfmeier et al., Maximum Entropy Deep Inverse Reinforcement Learning, arXiv preprint arXiv:1507.04888, 2015.

Xiong et al., Less is more: Learning highlight detection from Video Duration, In Proceedings of the IEEEConference on Computer Vision and Pattern Recognition, 2019, pp. 1258-1267.

YAO et al., Highlight Detection with Pairwise Deep Ranking for First-person Video Summarization, 2016 IEEE Conference on Computer Vision and Pattern Recognition (CVFR), 2016, pp. 982-990.

Zhang et al., Retrospective Encoders for Video Summarization, Proceedings of the European Conference on Computer Vision (ECCV), 2018.

Zhang et al., Video Summarization with Long Short-termMemory, European conference on computer vision. Springer, 2016, pp. 766-782.

Zhou et al., Deep Reinforcement Learning for Unsupervised Video Summarization w ith Diversity-representativeness Rew ard, arXiv preprint arXiv:1801.00054, 2017.

Zhou et al., Video Summarisation by Classification w ith Deep Reinforcement Learning, arXiv preprintarXiv:1807.03089, 2018.

Ziebart et al., Maximum Entropy Inverse Reinforcement Learning, In Aaai, vol. 8, 2008, pp. 1433-1438.

* cited by examiner

US 11,314,970 B1

REINFORCEMENT LEARNING TECHNIQUES FOR AUTOMATED VIDEO SUMMARIZATION

TECHNICAL FIELD

This disclosure relates generally to the field of artificial intelligence, and more specifically relates to machine-learning techniques for summarizing video content.

BACKGROUND

Video summarization systems are used to provide short videos that summarize content of full-length videos. For example, summarization of video content provides a brief overview of a longer video, such as a summary video that includes highlights of a soccer match. In addition, video summarization systems that utilize machine-learning techniques rapidly provide summary videos for a large volume of digital video content. For example, some conventional video summarization systems use neural networks configured to preserve information or maximize representation of summarized digital video content. However, present techniques for video summarization do not account for editorial preferences of an audience, such as an editorial decision to focus a video summary on exciting events in video content. In some cases, editorial preferences for summarizing video content are specific to a type of video content that is being summarized, such as domain-specific preferences for footage of a sporting event as compared to summarization preferences for footage of a news broadcast.

In some cases, a summary video generated by a conventional video summarization system arranges content in a way that is tedious or confusing to a human viewer of the summary video. In addition, conventional techniques for summarizing video content generate summary videos with relatively poor engagement for an audience. Furthermore, conventional techniques for summarizing video content do not account for editorial preferences for a specific type of video content.

SUMMARY

According to certain embodiments, a video summarization system generates a concatenated feature set by combining a feature set of a candidate video shot and additional feature sets included in a summarization feature set. The candidate video shot is included in a group of multiple video shots. The additional feature sets are associated with additional video shots from the group of multiple video shots. Based on the concatenated feature set, the video summarization system calculates multiple action options of a reward function. The reward function is included in a trained reinforcement learning module. The multiple action options describe a group of modification actions. The video summarization system determines a reward outcome included in the multiple action options. The reward outcome indicates a particular modification from the group of modification actions. Responsive to determining the reward outcome, the video summarization system modifies the summarization feature set to include the feature set of the candidate video shot by applying the particular modification indicated by the reward outcome. The video summarization system identifies video frames associated with the modified summarization feature set. The video summarization system generates a summary video based on the identified video frames.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
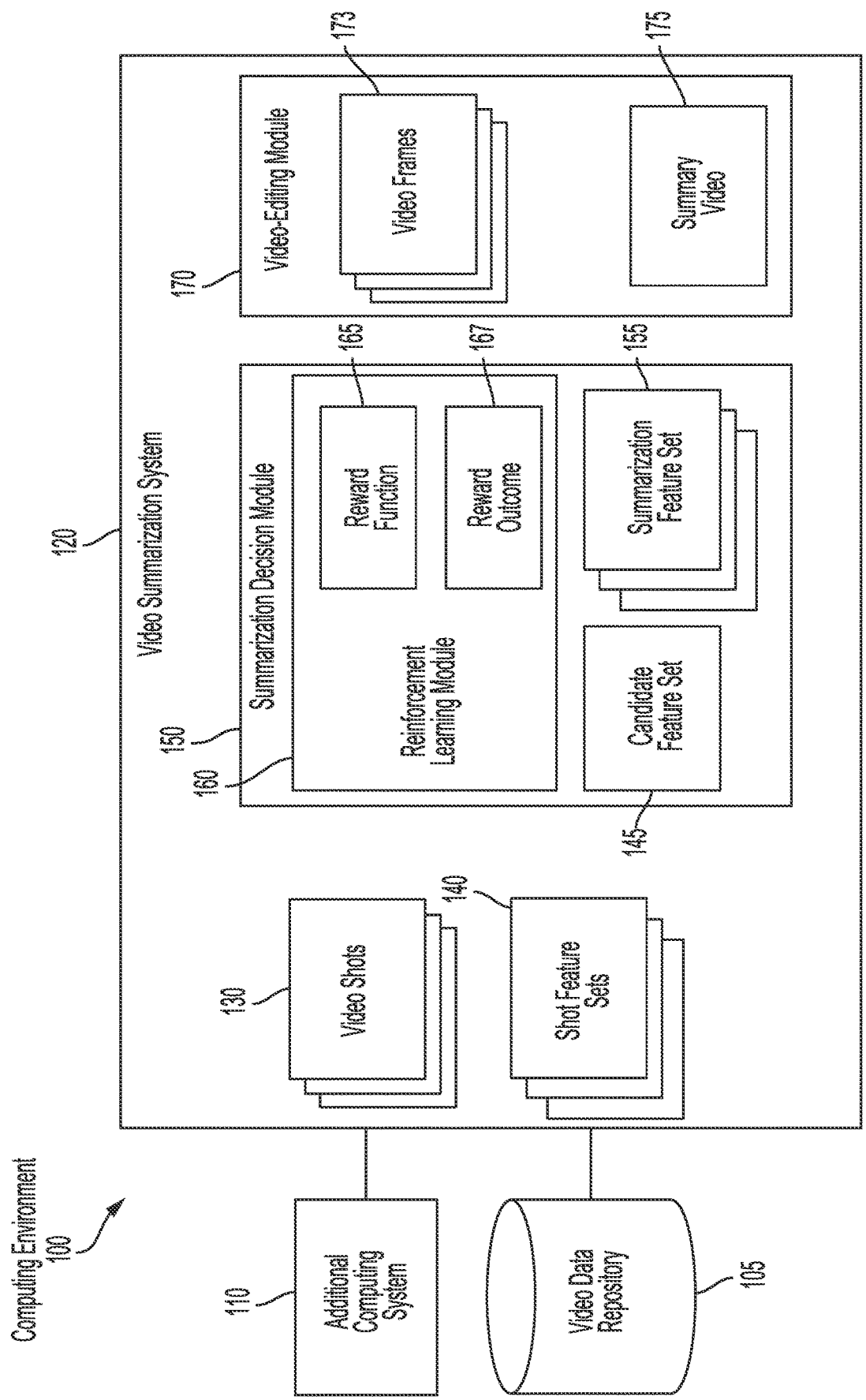
FIG. 1 is a diagram depicting an example of a computing environment that includes a video summarization system configured to generate a domain-specific summary video, according to certain embodiments.

As discussed above, prior techniques for summarizing digital video content do not account for editorial preferences in the generation of a summary video. In some cases, conventional video summary techniques do not generate a domain-specific summary video that is optimized for a particular domain of video content, which could cause relatively poor user engagement with a contemporary summary video. For example, some conventional video summarization systems use neural networks to summarize footage of sports events, news broadcasts, entertainment shows, social media content, or other sources of digital video content. However, since editorial preferences could vary widely among these example categories, failing to account for these preferences often generates videos that fail to include more relevant or attractive content.

These issues can be addressed by certain embodiments described herein. For instance, certain embodiments involve a video summarization system that accurately generates domain-specific summary videos by identifying video shots for inclusion in a summary video. Such a video summarization system applies a reward function with domain-specific parameters to feature sets of video shots, generating a summarization feature set that maximizes the reward function output, e.g., the features for video shots selected for the summary video. The video summarization system generates the summarization feature set and the summary video automatically, thereby reducing or eliminating labor-intensive efforts from a video-editing specialist. In some cases, these domain-specific video summaries improve understanding or engagement of an audience, such as improved understanding based on the audience's familiarity with a domain type for a particular video summary. Additionally or alternatively, the video summarization system generates the reward function by identifying the domain-specific parameters from a training set of expert demonstrations. In some cases, automatic generation of the reward function improves applicability and versatility of the video summarization system, such as by increasing a quantity of domains in which the video summarization system may be applied, while reducing human labor and effort related to manually determining a reward function for each domain.

The following examples are provided to introduce certain embodiments of the present disclosure. In this example, a video summarization system receives a group of video shots from an input video and feature sets describing the video shots. For example, if the input video is of a soccer match, the shots could include footage of particular activities occurring during the match, including a shot depicting kickoff, additional shots depicting passes between players, and additional shots depicting a goal, such as several camera angles of the goal. The video summarization system also generates a summarization feature set. For example, the summarization feature set includes feature sets of shots from the group, which have been evaluated by the video summarization system. In this example, the summarization feature set could be understood to include feature sets for shots that are suitable for inclusion in a summary video, from a sub-group of the shots that have already been evaluated by the video summarization system. For the example video of the soccer match, if the shots depicting kickoff and the player passes have been evaluated, the summarization feature set could include features for the shots of kickoff and some of the passes from the shots already evaluated.

Continuing with this example, the video summarization system identifies a candidate feature set for a candidate video shot from the group, such as an example shot of the goal, and concatenates the candidate feature set with the summarization feature set. The video summarization system applies a reward function to the concatenated feature set, and calculates multiple action options of the reward function using the concatenated feature set as input. Each of the action options describes a modification that could be applied to the summarization feature set, such as inserting the candidate feature set into the summarization feature set, replacing another feature set with the candidate feature set, or discarding the candidate feature set without modifying the summarization feature set. Using the action options, the video summarization system determines a reward outcome of the reward function, such as an example reward outcome that includes a maximum value from among the calculated action options. The reward outcome indicates a particular modification that is associated with the calculated action options, such as the modification associated with the maximum value. For instance, the video summarization system determines whether the reward outcome is maximized by calculating the action options to insert, replace, or discard the features associated with the shot of the soccer goal.

In this example, the video summarization system updates, responsive to determining the reward outcome, the summarization feature set using the particular modification. Examples of such a modification include inserting the candidate feature set, replacing another feature set in the summarization feature set, or discarding the candidate feature set without modifying the summarization feature set. In this example, the summarization feature set could be understood to be updated, responsive to evaluating each candidate feature set, to include feature sets for shots that are suitable for inclusion in a summary video. For example, responsive to determining that the shot depicting the goal maximizes the reward outcome, the video summarization system modifies the summarization feature set to include the features of the goal shot, and could replace features for one of the other shots, such as a player pass. The video summarization system identifies video frames that are associated with the feature sets in the summarization feature set, such as frames from the shots associated with the feature sets, and generates the summary video using the identified video frames. The example summary video could include frames depicting the kickoff shot, the selected shots of player passes, and goal shot.

Certain embodiments described herein provide improved video summarization techniques for generating a domain-specific summary video from digital video content. For instance, determining a reward outcome of a reward function involves applying particular rules, such as calculating multiple outcome actions of the reward function as applied to the concatenated feature sets. Additionally or alternatively, generating a reward function involves applying additional rules, such as generating a decision trajectory vector that encodes a demonstration summary video, or calculating parameters for a decision process vector by identifying action options that are included in the decision trajectory vector. In some cases, the application of these rules achieves an improved technological result, such as generating a domain-specific video summary with improved consistency with the particular domain of the input video. In an additional improved technological result, multiple domain-specific summary videos for multiple domains are generated with improved speed and efficiency, such as by reducing labor-intensive time and effort by one or more video-editing specialists who are trained the multiple domains. Thus, embodiments described herein improve computer-implemented processes for generating a domain-specific summary video from digital video content, thereby providing a more suitable solution for automating tasks previously performed by humans.

As used herein, the term "neural network" refers to one or more computer-implemented networks capable of being trained to achieve a goal. Unless otherwise indicated, references herein to a neural network include one neural network or multiple interrelated neural networks. For example, a neural network includes one or more subnetworks or components, and a subnetwork may also include one or more subnetworks or components. In some cases, one or more neural networks are trained together.

As used herein, the term "feature" refers to a representation of one or more characteristics of an image, such as characteristics of a frame of a video. A feature includes, for example, a value, equation, or data structure that represents a characteristic. Additionally or alternatively, one or more features are represented as a vector (e.g., a feature value in a vector cell, a series of feature values in a vector dimension). In some embodiments, features include (or include representations of) edges, shapes, colors, gradients, transformations, filters, semantic content (e.g., subject matter of the image), or other suitable characteristics of an image. In some cases, features include data that is not intended for human interpretation, such as a data structure or a mathematical description of a characteristic.

As used herein, the term "image" refers to a digital image depicting a graphical representation of subject matter. For example, an image uses pixels or vector-based graphics to represent a depiction of one or more objects. In some embodiments, the image is included in a collection of images, such as a frame within digital video content. Additionally or alternatively, digital video content includes one or more images, such as video frames (e.g. "frames"). In some cases, multiple images have a sequence, such as sequential frames included in a video.

As used herein, the term "shot" refers to a group of one or more video frames that depict a related portion of digital video content. For example, a shot includes a sequence of frames that convey information from video footage, such as footage of a conversation or a sports activity. In some cases, a shot is represented by a sequence of frames that depict the related portion of digital video content. Additionally or alternatively, a termination of a shot is indicated by an additional frame, e.g., in an additional shot, that depicts a different related portion of the digital video content. For example, a transition between shots is indicated by, without limitation, a camera cut, a scene change, or another suitable transition between portions of digital video content.

As used herein, the term "domain" refers to a category of digital video content, such as a category that generally describes a video type. In some cases, a domain includes a topic of content conveyed by a group of videos, such as "sports," "news," "drama," "musical," or any other suitable topic. Additional non-limiting example of a domain include filming techniques, an intended audience, a distribution channel (e.g., social media, theatrical release), or any other suitable domain by which video content could be categorized.

In some cases, editorial preferences for video summarization are domain-specific, such as expert knowledge that reflects preferences of an audience for a particular type of video content. For instance, based on expert knowledge in the domain of sporting events, a video-editing technician could choose to summarize a sporting event video by focusing the summary video on goals or fouls. Additionally or alternatively, based on expert knowledge in the domain of performing arts, the video-editing technician could choose to summarize a theater performance video by focusing the summary video on musical highlights or emotional portions of the theater performance.

Referring now to the drawings, FIG. 1 is an example of a computing environment 100 that includes a video summarization system 120 that is configured to generate one or more summary videos, such as domain-specific summary videos. The computing environment 100 includes one or more of the video summarization system 120, an additional computing system 110, or a video data repository 105. In some cases, the video summarization system 120 could be included in, or otherwise capable of communicating with, a video distribution system. For example, a person who wishes to provide one or more summary videos via the video distribution system accesses the video summarization system 120, such as via a user interface. In some cases, the video distribution system includes, or is otherwise capable of communicating with, one or more of the additional competing system 110 or the video data repository 105. The additional computing system 110 could be, for instance, one or more of a video publishing system, a video archive system, a search-and-retrieval system, a user computing device by which the example user interface is displayed, or any other suitable type of computing system that could be included in a video distribution system. In some implementations, the video summarization system 120 provides the summary videos to one or more of the video distribution system, the additional computing system 110, or the video data repository 105.

In some implementations, the video summarization system 120 receives one or more digital videos for summarization, such as a group of video shots 130. Additionally or alternatively, the video summarization system 120 receives one or more sets of features that describe the digital videos, such as a group of shot feature sets 140 that describe features of the video shots 130. In some cases, each of the shot feature sets 140 includes image features extracted from a respective one of the video shots 130. The features in the shot feature sets 140 describe, for example, characteristics of the video shots 130, such as visual characteristics, audio characteristics, metadata characteristics (e.g., time duration of a shot, an image resolution of a shot, descriptive text or tags, color information of a shot), or other suitable characteristics of the video shots 130.

In FIG. 1, the video summarization system 120 receives the shots 130 and the shot feature sets 140 from, for instance, one or more additional components of the video summarization system 120, such as a video-splitting module or a feature-extraction neural network. Additionally or alternatively, the shots 130 and the shot feature sets 140 are received from one or more of the additional computing system 110 or the video data repository 105. For example, and not by way of limitation, the video summarization system 120 receives, from a user interface of the additional computing system 110, an input that indicates one or more of the video shots 130 or a digital video (e.g., in which the video shots 130 are included).

In some implementations, the video summarization system 120 includes one or more of a summarization decision module 150 or a video-editing module 170. The summarization decision module 150 receives, for example, one or more of the shot feature sets 140 or the video shots 130. Additionally or alternatively, the summarization decision module 150 generates a summarization feature set 155. The summarization feature set 155 includes one or more feature sets selected from the shot feature sets 140, such as feature sets that are identified as being associated with video shots from which a summary video could be generated. In some cases, the summarization feature set 155 is modified by the summarization decision module 150, such as a modification responsive to determining that an additional feature set from the sets 140 is included in the summarization feature set 155.

In some cases, the summarization decision module 150 includes at least one reinforcement learning module ("RL module"), such as a RL module 160. In FIG. 1, the RL module 160 is a trained RL module that is configured to apply one or more reward functions, such as a reward function 165, to one or more feature sets associated with respective video shots. For example, for each candidate video shot included in the video shots 130, the RL module 160 applies the reward function 165 to the candidate feature set corresponding to the candidate video shot, such as a candidate feature set 145. Additionally or alternatively, the RL module 160 determines a reward outcome 167 for the candidate feature set 145. The reward outcome 167 is determined, for example, by applying the reward function 165 to a concatenated feature set that includes the candidate feature set 145 and the summarization feature set 155. In some cases, the reward outcome 167 is associated with a modification from a group of modification actions. For example, by calculating a value of the reward outcome 167, the summarization decision module 150 determines a particular modification from the group of modification actions to apply to the summarization feature set 155. In some cases, a first modification action includes inserting the candidate feature set 145 in the summarization feature set 155, such as by appending the candidate feature set 145 to the summarization feature set 155. Additionally or alternatively, a second modification action includes replacing a particular feature set from the summarization feature set 155 with the candidate feature set 145, such as by removing the particular feature set and appending (or otherwise inserting) the candidate feature set 145 into the summarization feature set 155. Furthermore, a third modification action includes discarding the candidate feature set 145, such as by maintaining the summarization feature set 155 for a subsequent application of the reward function 165 to a subsequent candidate from the shot feature sets 140.

In some cases, the RL module 160 applies the reward function 165 multiple times. For instance, the summarization decision module 150 applies the reward function 165 to multiple candidate sets from the shot feature sets 140, such as by modifying the candidate feature set 145 to omit a previous candidate set and include a subsequent candidate set from the feature sets 140. Additionally or alternatively, the summarization decision module 150 calculates the reward outcome 167 multiple times, such as by calculating respective reward outcomes for each of the multiple candidate sets from the shot feature sets 140. In some cases, the summarization decision module 150 modifies the summarization feature set 155 multiple times. For example, for each candidate feature set 145 from the shot feature sets 140, the summarization decision module 150 determines whether to modify the summarization feature set 155. The modifications to the summarization feature set 155 are determined, for example, based on the respective reward outcomes for each of the multiple candidate sets, such as determining whether to apply the first, second, or third modification action to summarization feature set 155.

In FIG. 1, the video-editing module 170 receives the summarization feature set 155. For example, subsequent to calculating the respective reward outcome 167 for each candidate feature set 145, the summarization decision module 150 provides the summarization feature set 155 to the video-editing module 170. Additionally or alternatively, the video-editing module 170 identifies one or more video frames 173 associated with the summarization feature set 155, such as a respective video frame associated with a particular feature set. In some cases, the video frames 173 are selected from the video shots 130. For example, the video-editing module 170 identifies respective ones of the video shots 130 that are associated with each of the candidate feature sets, e.g., from the shot feature sets 140, included in the summarization feature set 155. One or more video frames are selected, for instance, from the identified respective ones of the video shots 130. In some cases, the video-editing module 170 generates the summary video 175 using the identified video frames 173. For example, by identifying an arrangement of feature sets within the summarization feature set 155, the video-editing module 170 identifies a sequence of the associated video frames 173. Additionally or alternatively, the video-editing module 170 generates the summary video 175 by arranging the video frames 173 in the identified sequence.

In some implementations, the video summarization system 120 provides the summary video 175 to one or more additional computing systems. For example, the summary video 175 is provided to one or more of the additional computing system 110 or the video data repository 105. In some cases, the additional computing system 110 is configured to display the summary video 175, such as via a user interface or display device. Additionally or alternatively, the video summarization system 120 provides the summary video 175 to one or more computing devices of the video distribution system. For example, a data repository of the video distribution system (with such as, without limitation, the repository 105) could receive the summary video 175. Additionally or alternatively, the video distribution system provides the summary video 175, such as in response to search queries (or other inputs), via a social media service, or by any other suitable distribution technique.

Figure 2:
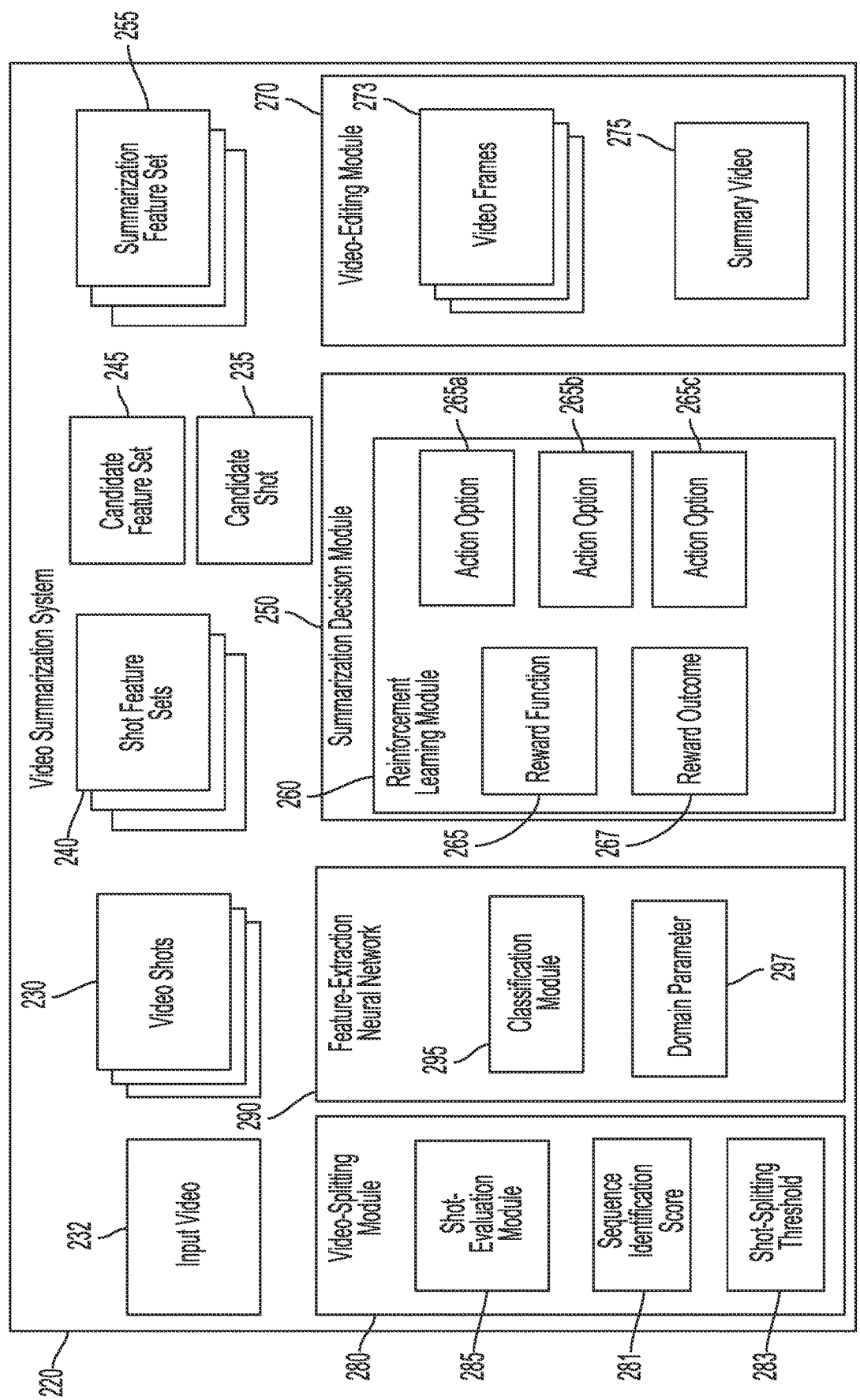
FIG. 2 is a diagram depicting an example of a video summarization system that is configured to generate a summary video based on one or more shots selected from an input video, according to certain embodiments.

In some implementations, a video summarization system is configured to generate a summary video by determining which shots, such as from one or more full-length videos, are to be included in the summary video. FIG. 2 depicts an example of a video summarization system 220 that is configured to generate a summary video 275 based on one or more shots selected from an input video 232. In some cases, the input video 232 is received from an additional computing system, such as a user computing device or a device included in a video distribution system (e.g., the additional computing system 110, the video data repository 105). In some cases, the video summarization system 220 is included in (or otherwise capable of communicating with) a video distribution system, such as described in regards to FIG. 1.

In some implementations, the video summarization system 220 includes one or more of a summarization decision module 250, a video-editing module 270, a video-splitting module 280, or a feature-extraction neural network 290. In FIG. 2, the video-splitting module 280 generates one or more video shots from the input video 232, such as a group of video shots 230. For example, the video-splitting module 280 applies a shot-evaluation module 285 to the input video 232. For each particular frame of the input video 232, the shot-evaluation module 285 calculates a score for the particular frame, such as a sequence identification score 281. In some cases, the respective sequence identification score 281 for each particular frame indicates a value (or set of values) that indicate an appearance of the particular frame. For example, the sequence identification score 281 has a value calculated from one or more visual characteristics of the particular frame, such as colors or locations of pixels within the frame. In some cases, the sequence identification score 281 has a value calculated from one or more additional characteristics of the particular frame, such as audio data, time data, or other suitable characteristics of a video frame. In some cases, the shot-evaluation module 285 generates the sequence identification score 281 for each frame using a perceptual hash algorithm. A non-limiting example of a perceptual hash algorithm is difference hash ("dHash"). However, other implementations are possible, including a video-splitting module that is configured to use one or more additional perceptual hash algorithms, or any other suitable technique to identify a group of frames that are included in a shot of an input video. In various embodiments, one or more of the video-splitting module 280 or the shot-evaluation module 285 can be implemented as one or more of program code, program code executed by processing hardware (e.g., a programmable logic array, a field-programmable gate array, etc.), firmware, or some combination thereof.

Additionally or alternatively, the shot-evaluation module 285 calculates a difference between respective sequence identification scores 281 of pairs of frames from the input video 232. For example, the shot-evaluation module 285 calculates the difference between the score for the particular frame and an additional score for an additional frame, e.g., a subsequent frame or a previous frame. In some cases, the difference between the sequence identification scores 281 for each pair of frames is compared to a threshold, such as a shot-splitting threshold 283. If the difference is within (or otherwise fulfills) the shot-splitting threshold 283, the video-splitting module 280 determines, for example, that the pair of frames are included in a particular shot of the input video 232. Additionally or alternatively, if the difference exceeds the shot-splitting threshold 283, the video-splitting module 280 determines that each frame of the pair of frames is included in a different shot. In some cases, a pair of sequential frames that are included in different shots represent a transition between shots of the input video 232, such as a camera cut, a scene change, or another suitable transition between video shots. In some cases, a sensitivity of the shot-evaluation module 285 is based at least in part on a value of the shot-splitting threshold 283. As a non-limiting example, if the shot-splitting threshold 283 has a relatively low value, e.g., frames are grouped into different shots based on relatively few visual differences, then the shot-evaluation module 285 could identify relatively short shots with relatively few frames included in each shot. Additionally or alternatively, if the shot-splitting threshold 283 has a relatively high value, e.g., frames are grouped into different shots based on relatively many visual differences, then the shot-evaluation module 285 could identify relatively long shots with relatively many frames included in each shot. In some cases, a value of the shot-splitting threshold 283 is adjusted based on a domain of the input video 232, such as a lower value for a dynamic or active video (e.g., sports footage) or a higher value for a calm or inactive video (e.g., interview footage).

In some cases, the shot-evaluation module 285 determines multiple differences between sequence identification scores 281, such as a difference for each sequential pair of frames in the input video 232. For each example frame n, for instance, a difference is determined between the sequence identification scores for frames n and n+1, and an additional difference is determined between the sequence identification scores for frames n and n−1. By comparing the differences to the shot-splitting threshold 283, the video-splitting module 280 identifies which frames are included within a particular shot (e.g., having differences within the threshold 283), and which frames are included in multiple shots (e.g., having differences that exceed the threshold 283). Additionally or alternatively, the video-splitting module 280 identifies the video shots 230 using the groups of frames that are included within respective shots.

In FIG. 2, the video-splitting module 280 generates one or more of the video shots 230 by applying the shot-evaluation module 285 to the input video 232. Additionally or alternatively, the feature-extraction neural network 290 determines one or more sets of features for the video shots 230, such as a group of shot feature sets 240. In some cases, each feature set of the shot feature sets 240 includes features extracted from a respective one of the video shots 230. Additionally or alternatively, each feature set of the shot feature sets 240 includes one or more classification labels classifying a respective one of the video shots 230. In some implementations, one or more of the features are determined based on domain-specific parameters, such as classification labels that are determined based on a domain-specific group of available labels. The features in the feature sets 240 describe, for example, characteristics of the video shots 230, such as visual characteristics, audio characteristics, metadata characteristics, or other suitable characteristics of video data. In some implementations, the feature-extraction neural network 290 generates data structures representing features for respective video shots. For example, each of the shot feature sets 240 includes a one-dimensional ("1-D") vector with features for a respective one of the video shots 230. In some cases, the feature-extraction neural network 290 includes one or more neural networks (or sub-networks) that are trained to extract features of the video shots 230. In some cases, a first neural network (or sub-network) is trained to identify visual features of a particular video shot, a second neural network (or sub-network) is trained to identify audio features of the particular video shot, or an additional neural network (or sub-network) is trained to identify additional types of features of the particular video shot. Non-limiting examples of neural networks included in the feature-extraction neural network 290 could include a long-short term memory neural network ("LSTM"), a convolutional neural network ("CNN"), a recursive neural network ("RNN"), an inception neural network, or any other suitable type of neural network or combination of neural networks that are trained to identify features of digital video content.

In some implementations, the feature-extraction neural network 290 includes (or is configured to communicate with) one or more classification modules, such as a classification module 295. Additionally or alternatively, the classification module 295 identifies one or more classification labels for one or more of the video shots 230. For example, the classification module 295 analyzes each of the shot feature sets 240 to identify at least one classification label for each of the associated video shots 230. In some cases, the classification module 295 identifies labels indicating semantic content of the video shots 230. If the video shots 230 include footage of a soccer match, for example, the classification labels could indicate soccer-related content, such as "kickoff," "goal," "foul," "injury," "audience reaction," or other suitable labels describing content of soccer footage. In some cases, a set of available classification labels is received by the video summarization system 220, such as with the input video 232. Non-limiting examples of classification modules could include a CNN, an LSTM, a deep neural network, or any other suitable type of neural network or combination of neural networks that are trained to generate a classification label for digital video content. In various embodiments, one or more of the feature-extraction neural network 290 or the classification module 295 can be implemented as one or more of program code, program code executed by processing hardware (e.g., a programmable logic array, a field-programmable gate array, etc.), firmware, or some combination thereof.

In some cases, the classification module 295 is trained to identify classification labels using one or more domain-specific classification parameters that describe classification techniques for digital video content having a particular domain type. In some cases, training using domain-specific classification parameters includes supervised training. For example, the classification module 295 receives a domain parameter 297 that represents one or more neural network parameters for domain-specific classification of the video shots 230. The domain parameter 297 could include, for example, parameters from an additional neural network that is trained to identify classification labels for video content in a sports domain, such as footage of soccer matches. In some cases, the classification module 295 uses the domain parameter 297 to classify video shots in a comparable domain, such as additional footage of soccer matches. The comparable domain can be identical, such as domain parameters for professional soccer matches, or the comparable domain can be similar and non-identical, such as domain parameters for professional soccer matches applied to classifying amateur soccer matches. Additionally or alternatively, the classification module 295 is re-trained using the domain parameter 297 to classify video shots in a related domain, such as footage of rugby matches. For example, the classification module 295 is re-trained to classify footage of rugby matches by applying received domain parameters for classifying soccer matches. In some cases, training a classification module using domain-specific classification parameters, including domain parameters from a comparable domain or a related domain, can reduce time and computational resources for training the classification module. Additionally or alternatively, training a classification module using domain-specific classification parameters, including domain parameters from a comparable domain or a related domain, can provide more accurate classification of video shots.

In some implementations, domain-specific classification parameters could be unavailable or inappropriate for a classification module that is being trained to classify digital video content in a particular domain. As a non-limiting example, domain parameters for classifying soccer matches could be inappropriate for training a classification module to classify footage of journalism interviews. In some cases, a classification module is trained via unsupervised training techniques. Non-limiting examples of unsupervised training techniques include k-means clustering, hierarchical clustering, or any other suitable technique or combination of techniques to classify digital video footage.

In FIG. 2, the summarization decision module 250 receives one or more of the shot feature sets 240 or the video shots 230. Additionally or alternatively, the summarization decision module 250 generates a summarization feature set 255. The summarization feature set 255 includes, for example, one or more feature sets selected from the shot feature sets 240. In some cases, the summary video 275 is generated using video shots, e.g., from the shots 230, that are associated with the feature sets in the summarization feature set 255. In various embodiments, the summarization decision module 250 can be implemented as one or more of program code, program code executed by processing hardware (e.g., a programmable logic array, a field-programmable gate array, etc.), firmware, or some combination thereof.

In some implementations, the summarization decision module 250 includes an RL module 260. The RL module 260 is configured to apply one or more reward functions, such as a reward function 265, to one or more candidate feature sets from the shot feature sets 240. The reward function 265 is applied, for example, to a candidate feature set 245 that is associated with a candidate video shot 235 from the video shots 230. Additionally or alternatively, the RL module 260 determines a reward outcome 267 for the candidate feature set 245. For example, the RL module 260 generates a concatenated feature set that includes the candidate feature set 245 and the summarization feature set 255. The RL module 260 applies the reward function 265 to the concatenated feature set, such as by performing one or more operation described by the reward function 265 using a vector of values included in the concatenated feature set. Additionally or alternatively, the RL module 260 calculates the reward outcome 267 from the reward function 265, as applied to the concatenated feature set. In various embodiments, the RL module 260 can be implemented as one or more of program code, program code executed by processing hardware (e.g., a programmable logic array, a field-programmable gate array, etc.), firmware, or some combination thereof.

In some implementations, the reward outcome 267 is identified from a group of multiple action options, such as a group including a first action option 265a, a second action option 265b, and a third action option 265c. For example, the reward function 265 includes one or more operations that calculate (e.g., based on the concatenated feature set) a value that indicates action option identified for the reward outcome 267. In FIG. 2, each action option describes a modification action that can be applied to the summarization features set 255. For example, the first action option 265a describes an "insert" action, such as a modification action to insert a candidate feature set being evaluated by the reward function 265 into the summarization feature set 255. Additionally or alternatively, the second action option 265b describes a "replace" action, such as a modification action to remove a particular feature set from the summarization feature set 255 and to insert the candidate feature set into the summarization feature set 255. Furthermore, the third action option 265c describes a "discard" action, such as a modification action to not modify the summarization feature set 255 using the candidate feature set being evaluated, and to discard or otherwise disregard the candidate feature set.

In some cases, the summarization decision module 250 modifies the summarization feature set 255 in response to the reward outcome 267, such as by performing the "insert" action or the "replace" action to append or otherwise include the candidate feature set 245 in the summarization feature set 255. Additionally or alternatively, the summarization decision module 250 omits a modification of the summarization feature set 255 in response to the reward outcome 267, such as by performing the "discard" action to disregard the candidate feature set 245.

In FIG. 2, the RL module 260 applies the reward function 265 multiple times, such as by calculating a respective reward outcome for each feature set included in the shot feature sets 240. In some cases, application of the reward function 265 is iterative, such as an iteration for each of the shot feature sets 240. For instance, for each particular feature set of the shot feature sets 240, the RL module 260 generates a concatenated feature set that includes the particular set that is being evaluated during that iteration (e.g., the candidate feature set 245), and the summarization feature set 255 that was generated or modified during the previous iteration. During each iteration, the RL module 260 determines whether to modify the summarization feature set 255 to include the particular set that is being evaluated (e.g., via the "insert" action or the "replace" action). Additionally or alternatively, the video summarization system 220 stores the summarization feature set 255, including any determined modifications, for use in a subsequent iteration by the RL module 260. In some cases, iterative application of the reward function 265 evaluates features associated with each of the video shots 230 to generate respective reward outcomes indicating which of the shots 230 could be included in the summary video 275.

In some implementations, the RL module 260 is trained to apply the reward function 265. Additionally or alternatively, the RL module 260 generates the reward function 265, such as during training. For instance, the summarization decision module 260 receives training data that includes one or more expert demonstrations. The expert demonstrations include, for example, training sets of a demonstration video (e.g., full-length videos) and an associated demonstration summary video that is generated based on the demonstration video. The training sets include demonstration summary videos that are generated by, for example, a human technician who is experienced in summarization of video content. In some cases, the summarization decision module 260 generates or modifies the reward function 265 based on the training data. For example, the RL module 260 identifies a trajectory of a particular training set, such as by identifying which shots from the demonstration video are (or are not) included in the associated demonstration summary video. Additionally or alternatively, the RL module 260 modifies one or more parameters of the reward function 265 by determining a parameter value that, when applied to each frame of the demonstration video, selects the shots from the demonstration video that are included in the associated demonstration summary video. A non-limiting example of a training technique is inverse reinforcement learning ("IRL"), but other training techniques are available.

In FIG. 2, the video-editing module 270 receives the summarization feature set 255, such as subsequent to the reward function 265 being applied to each of the feature sets in the shot feature sets 240. Additionally or alternatively, the video-editing module 270 identifies one or more video frames 273 that are associated with the summarization feature set 255. For example, the video-editing module 270 identifies frames of each shot (e.g., from the video shots 230) that are associated with a feature set in the summarization feature set 255. Additionally or alternatively, the video-editing module 270 identifies a sequence of the video frames 273, such as a sequence indicated by respective timestamps of the frames 273, by a sequence of the associated feature sets in the summarization feature set 255, or another suitable indication of sequence for the video frames 273. In some cases, the video-editing module 270 generates the summary video 275 by arranging the video frames 273 in the identified sequence. In some cases, the summary video 275 includes audio data, metadata, or other suitable data associated with the video frames 273. In some implementations, the video-editing module 270 generates additional video content for inclusion in the summary video 275. As a non-limiting example, the video-editing module 270 generates one or more intermediate frames, such as frames that are arranged in between shots within the summary video 275. For example, the intermediate frames could display descriptive information of the shots, such as a timestamp from the input video 232 from which the video shots 230 are extracted, text information describing the shots (e.g., "Goal in second half"), or additional information describing the shots that are included in the summary video 275. Additionally or alternatively, the intermediate frames could depict video effects, such as fade-ins, fade-outs, wipes, solid-color frames (e.g., black screen color), sound transitions, or any other suitable effect for digital video content. In various embodiments, the video-editing module 270 can be implemented as one or more of program code, program code executed by processing hardware (e.g., a programmable logic array, a field-programmable gate array, etc.), firmware, or some combination thereof.

Figure 3:
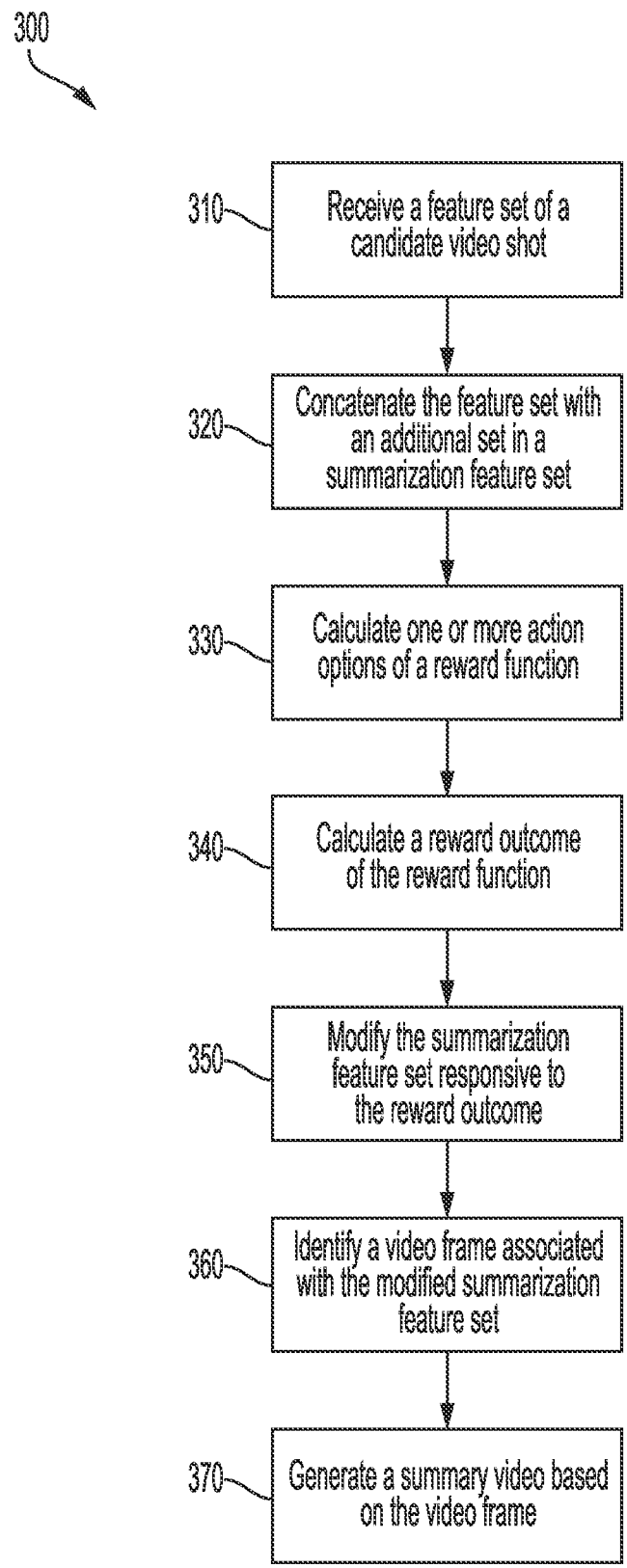
FIG. 3 is a flow chart depicting an example of a process for generating a domain-specific summary video, according to certain embodiments.

FIG. 3 is a flow chart depicting an example of a process 300 for generating a domain-specific summary video. In some embodiments, such as described in regards to FIGS. 1-2, a computing device executing a video summarization system implements operations described in FIG. 3, by executing suitable program code. For illustrative purposes, the process 300 is described with reference to the examples depicted in FIGS. 1-2. Other implementations, however, are possible. In some embodiments, one or more operations described herein with respect to the process 300 can be used to implement one or more steps for generating a summary video, including a domain-specific summary video.

At block 310, the process 300 involves receiving one or more feature sets, such as a feature set associated with a candidate video shot. In some embodiments, a summarization decision module included in a video summarization system receives one or more of the feature set or the candidate video shot. In some cases, the feature set is included in a group of feature sets, such as the shot feature sets 240. Additionally or alternatively, the associated candidate video shot is included in a group of video shots, such as the video shots 230. For example, the summarization decision module 250 receives the candidate feature set 245 and the associated candidate shot 235 from one or more of the video-splitting module 280 or the feature-extraction neural network 290. In some cases, the feature set received by the example summarization decision module includes one or more of classification labels, including domain-specific classification labels.

At block 320, the process 300 involves concatenating the feature set with one or more additional feature sets, such as additional feature sets in a summarization feature set. In some cases, the additional feature sets are associated with additional video shots included in the group of video shots that includes the candidate video shot. Additionally or alternatively, the summarization decision module appends (or otherwise concatenates) the feature set of the candidate video shot to the summarization feature set. For example, the summarization decision module 250 concatenates the candidate feature set 245 with additional feature sets included in the summarization feature set 255.

At block 330, the process 300 involves calculating multiple action options of a reward function based on the concatenated feature set. Additionally or alternatively, the multiple action options are calculated by applying the reward function to the concatenated feature set. For example, an RL module included in the example summarization decision module applies the reward function by performing one or more mathematical operations described by the reward function using values of the features included in the concatenated feature set. In some cases, the multiple action options of the reward function describe a group of modifications that can be applied to a feature set, such as the summarization feature set. For example, the RL module 260 applies the reward function 265 to the concatenated feature set including sets 245 and 255. Additionally or alternatively, the RL module 260 calculates one or more of the action options 265$a$, 265$b$, or 265$c$ using values of the concatenated feature sets 245 and 255. The action options 265$a$, 265$b$, or 265$c$ describe, for example, modification actions that could be performed using the concatenated feature set. In some cases, one or more operations described with respect to block 330 can be used to implement a step for calculating multiple action options of a reward function.

At block 340, the process 300 involves calculating, such as by the RL module, a reward outcome of the reward function. The reward outcome is included, for example, in the multiple action options of the reward function. In some cases, the reward outcome indicates a particular modification from the group of modifications described by the multiple action options. For example, the RL module 260 determines the reward outcome 267 in response to applying the reward function 265 to the concatenated feature sets 245 and 255. Additionally or alternatively, the reward outcome 267 is determined from one or more of the action options 265$a$, 265$b$, or 265$c$. In some cases, one or more of the example action options or the example reward outcome are calculated using domain-specific feature sets, such as domain-specific classification labels or domain-specific video features that are determined for feature set associated with the candidate video shot. In some cases, one or more operations described with respect to block 340 can be used to implement a step for determining a reward outcome from a group of multiple action options.

At block 350, the process 300 involves modifying the summarization feature set in response to the reward outcome. Additionally or alternatively, the summarization feature set is modified by applying the particular modification indicated by the reward outcome. In some cases, the summarization decision module modifies the summarization feature set to include the feature set of the candidate video shot. For example, the summarization decision module 250 modifies the summarization feature set 255 to include the candidate feature set 245. The modification to include the candidate feature set 245 is responsive to, for example, the reward function 265 indicating an "insert" action or a "replace" action, e.g., described by action options 265a or 265b. In some cases, one or more operations described with respect to block 350 can be used to implement a step for modifying a summarization feature set by applying a modification indicated by a reward outcome.

In some embodiments, operations related to one or more of blocks 310, 320, 330, 340, or 350 are repeated, such as for each feature set associated with one of multiple candidate video shots. For instance, the summarization decision module 250 applies the reward function 265 to multiple candidate feature sets from the shot feature sets 240. Additionally or alternatively, the summarization decision module 250 calculates multiple reward outcomes 267 for each of the candidate feature sets, and performs multiple modifications to the summarization feature set 255. In some cases, one or more of the candidate feature set 245, the candidate shot 235, the reward outcome 267, or the summarization feature set 255 are iteratively modified by the summarization decision module 250, such as an iterative determination of a respective action option associated with each reward outcome calculated for each candidate feature set from the feature sets 240.

In some embodiments, one or more operations described herein with respect to blocks 330-350 can be used to implement one or more steps for generating a summary video by modifying a summarization feature set responsive to calculating a reward outcome of a reward function.

At block 360, the process 300 involves identifying one or more video frames associated with the modified summarization feature set. In some cases, a video-editing module included in the example video summarization system determines video frames from each candidate video shot associated with the feature sets in the summarization feature set. For example, the video-editing module 270 identifies the video frames 273 that are associated with the summarization feature set 255. Additionally or alternatively, the video frames 273 include frames from each video shot that is associated with a candidate feature set included in the summarization feature set 255.

At block 370, the process 300 involves generating a summary video based on the one or more video frames. In some cases, the summary video is a domain-specific summary video that includes video frames selected based on domain-specific feature sets, such as feature sets that include domain-specific classification labels or video features for respective candidate video shots. For example, the video-editing module 270 generates the summary video 275 using the video frames 273. In some cases, the video frames 273 are associated with feature sets that are identified (e.g., for inclusion in the summarization feature set 255) via analysis of one or more domain-specific features. For example, the feature-extraction neural network 290 or the classification module 295 (or both) generate one or more of the shot feature sets 240 based on the domain parameter 297.

Figure 4:
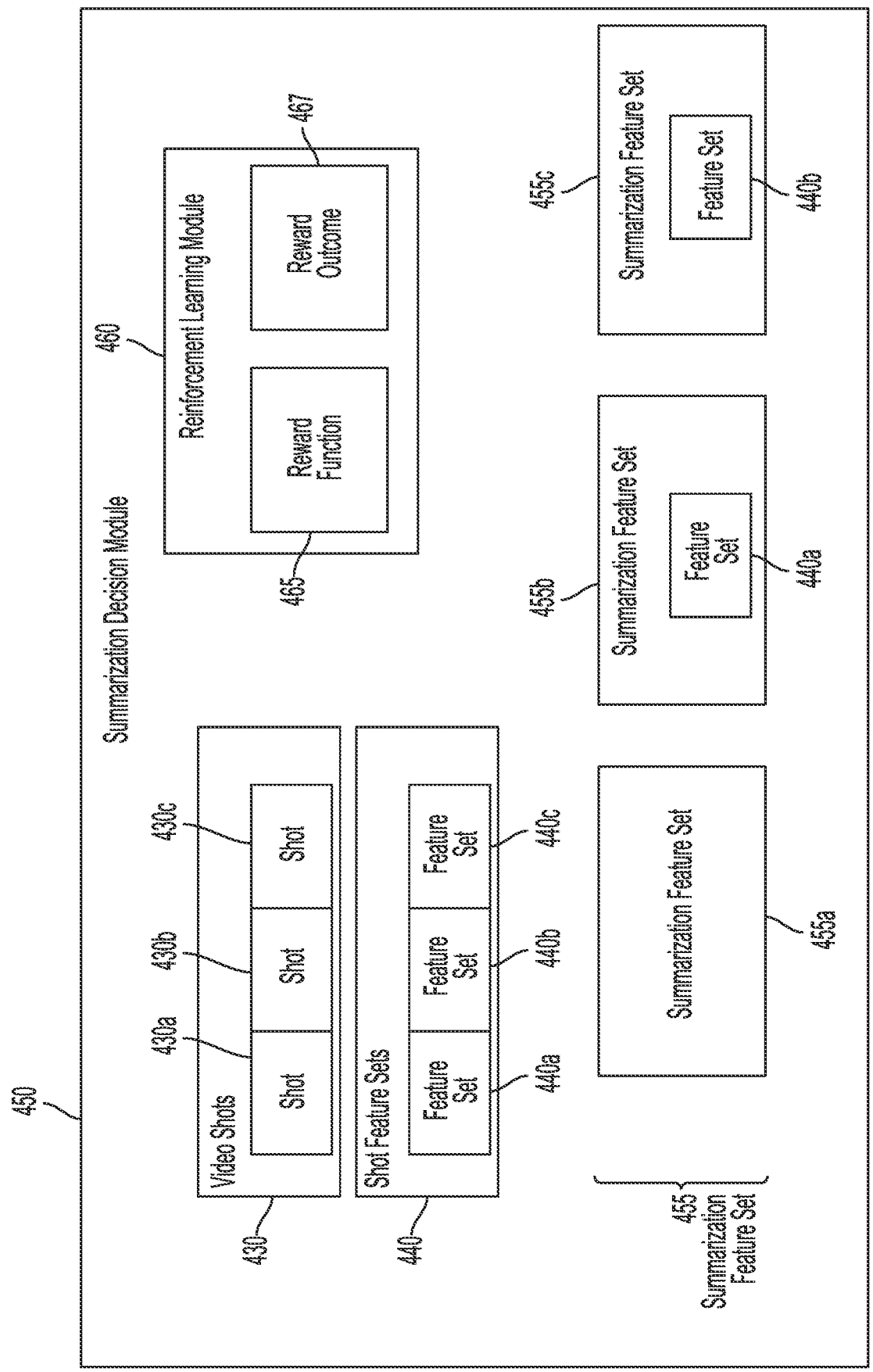
FIG. 4 is a diagram depicting an example of a summarization decision module 450 that is configured to identify and perform multiple modifications for a summarization feature set, according to certain embodiments.

In some implementations, a video summarization system applies multiple modifications to a summarization feature set. For example, a summarization decision module included in the video summarization system identifies a modification action associated with a calculated reward outcome for each candidate feature set for a group of candidate video shots. In some cases, the group of candidate video shots includes a sequence of shots from digital video content. FIG. 4 depicts an example of a summarization decision module 450 that is configured to identify and perform multiple modifications for a summarization feature set 455. The summarization decision module 450 is included in (or otherwise configured to communicate with) a video summarization system configured to generate a domain-specific summary video, such as the video summarization system 220. In some cases, the summarization decision module 450 includes one or more RL modules, such as an RL module 460. The summarization decision module 450 receives a group of video shots 430 and a group of shot feature sets 440, such as from one or more additional components of the video summarization system (e.g., as described in regards to FIGS. 1-3).

In FIG. 4, each of the video shots 430 is associated with a particular one of the shot feature sets 440. The video shots 430 include (at least) a shot 430a, a shot 430b, and a shot 430c (collectively referred to herein as video shots 430). The shot feature sets 440 include (at least) a feature set 440a, a feature set 440b, and a feature set 440c (collectively referred to herein as shot feature sets 440). The video shots 430a, 430b, and 430c are associated, respectively, with shot feature sets 440a, 440b, and 440c. In some implementations, each of the shot feature sets 440 includes one or more features of the respective one of the video shots 430. For example, the shot feature sets 440 include one or more of visual features, audio features, classification labels, or other suitable features of the video shots 430. In some cases, the shot feature sets 440 include one or more domain-specific features for the video shots 430, such as, without limitation, a domain-specific classification label for each one of the video shots 430.

In some implementations, the summarization decision module 450 identifies a modification action for each one of the shot feature sets 440. Additionally or alternatively, the modification action is determined by applying a reward function 465 to one or more of the summarization feature set 455 or the shot feature sets 440. For example, the RL module 460 determines a reward outcome 467 by applying the reward function 465 to a concatenated feature set that includes a candidate feature set from the shot feature sets 440. In FIG. 4, the reward function 465 is associated with a group of modification actions including an "insert" action, a "replace" action, and a "discard" action. For convenience, and not by way of limitation, FIG. 4 is described in regards to a group of modification actions that includes an "insert" action, a "replace" action, and a "discard" action, but other modification actions are possible, such as a "duplicate" action, a "reorder" action (e.g., modifying a sequence of feature sets), an "undo" action (e.g., undoing a previous modification action), or any other suitable modification action that could be applied to a group of feature sets.

In some cases, identifying the modification action or applying the reward function 465 are performed iteratively. For example, in a first iteration, the summarization decision module 450 generates (or modifies) a candidate video shot that includes the shot 430a and a candidate feature set that includes the feature set 440a. Additionally or alternatively, the summarization decision module 450 generates (or modifies) a summarization feature set 455a. In some cases, the summarization feature set 455a is a first state of the summarization feature set 455, such as a state during the first iteration. For example, the summarization feature set 455a could include one or more feature sets from a previous iteration by the summary decision module 450. Additionally or alternatively, the summarization feature set 455a could include an empty set, such as a default or "null" feature set suitable for an initial iteration by the summarization decision module 450.

The summarization decision module 450 modifies the summarization feature set 455a based on the reward outcome 467 for the feature set 440a. For example, during the first iteration, the reward function 465 is applied to a first concatenated feature set that includes the summarization feature set 455a and the candidate feature set 440a. Additionally or alternatively, the RL module 460 calculates the reward outcome 467 using one or more values from the first concatenated feature set. The reward outcome 467 indicates, for example, a particular one of the modification actions associated with the reward function 465, such as the "insert" action. During the first iteration, the summarization decision module 450 applies the particular modification action to the summarization feature set 455a, such as by inserting the candidate feature set 440a. In some cases, modifying the summarization feature set 455a generates a second state of the summarization feature set 455, such as a summarization feature set 455b.

In FIG. 4, the summarization decision module 450 modifies one or more of the summarization feature set 455, the reward outcome 467, or a candidate feature set during one or more subsequent iterations in applying the reward function 465. For example, during a second iteration, the summarization decision module 450 receives (or generates) the summarization feature set 455b. Additionally or alternatively, the summarization decision module 450 modifies the candidate video shot to include the shot 430b (e.g., removing the shot 430a) and the candidate feature set to include the feature set 440b (e.g., removing the feature set 440a). During the second iteration, the reward function 465 is applied to a second concatenated feature set that includes the summarization feature set 455b and the modified candidate feature set 440b. The RL module 460 calculates (or modifies) the reward outcome 467 using one or more values from the second concatenated feature set, and a second modification action is identified using the reward outcome 467, such as the "replace" action. During the second iteration, summarization decision module 450 applies the second modification action to the summarization feature set 455b, such as by inserting the candidate feature set 440b and removing the feature set 440a. In some cases, modifying the summarization feature set 455b generates a third state of the summarization feature set 455, such as a summarization feature set 455c.

During a third iteration of the reward function 465, the summarization decision module 450 receives the summarization feature set 455c. Additionally or alternatively, the summarization decision module 450 modifies the candidate feature set to include the feature set 440c (e.g., removing the feature set 440b). During the third iteration, the reward function 465 is applied to an additional concatenated feature set that includes the summarization feature set 455b and the modified candidate feature set 440c. The RL module 460 calculates (or modifies) the reward outcome 467 using one or more values from the third concatenated feature set, and a third modification action is identified using the reward outcome 467, such as the "discard" action. During the second iteration, summarization decision module 450 applies the third modification action to the summarization feature set 455c, such as by maintaining the feature set 440b and discarding (e.g., not including) the candidate feature set 440c. In some cases, modifying the summarization feature set 455b generates an additional state of the summarization feature set 455. Additionally or alternatively, the summarization decision module 450 performs additional iterations using the additional state of the summarization feature set 455, such as additional iterations that apply the reward function 465 to additional feature sets from the shot feature sets 440. In FIG. 4, the summarization feature set 455c includes a single candidate feature set, e.g., set 440b, but other implementations are possible, such as a state of the summarization feature set 455 that includes multiple feature sets selected from the shot feature sets 440. In some implementations, upon completion of multiple iterations of the reward function, e.g., iterations evaluating each of the candidate feature sets in the shot feature sets 440, the summarization decision module 450 provides the summarization feature set 455 to a video-editing module of the video summarization system. Additionally or alternatively, a summary video is generated using one or more video frames associated with the summarization feature set 455, such as described elsewhere herein.

In some implementations, one or more components of a video summarization system are trained to generate or apply a reward function. For example, an RL module, or a subcomponent of the RL module, is trained to generate (or modify) a reward function, such as by calculating values of parameters included in the reward function. Additionally or alternatively, the RL module, or an additional sub-component of the RL module, is trained to apply the reward function, such as by comparing an output of a reward function to a training example. For instance, the RL module that is being trained could receive training data that includes a demonstration video and an associated demonstration summary video that was generated based on the demonstration video. In some cases, the RL module being trained applies a reward function to the demonstration video and compares an output of the reward function (e.g., a summary video, a summarization feature set) to the associated demonstration summary video. Additionally or alternatively, the RL module modifies one or more parameters of the reward function during training, such that output of the modified reward function is relatively similar to the demonstration summary video. In some cases, the RL module is trained (or partially trained) via one or more neural networks, such as a neural network in the RL module that is trained to identify parameters of the reward function.

Figure 5:
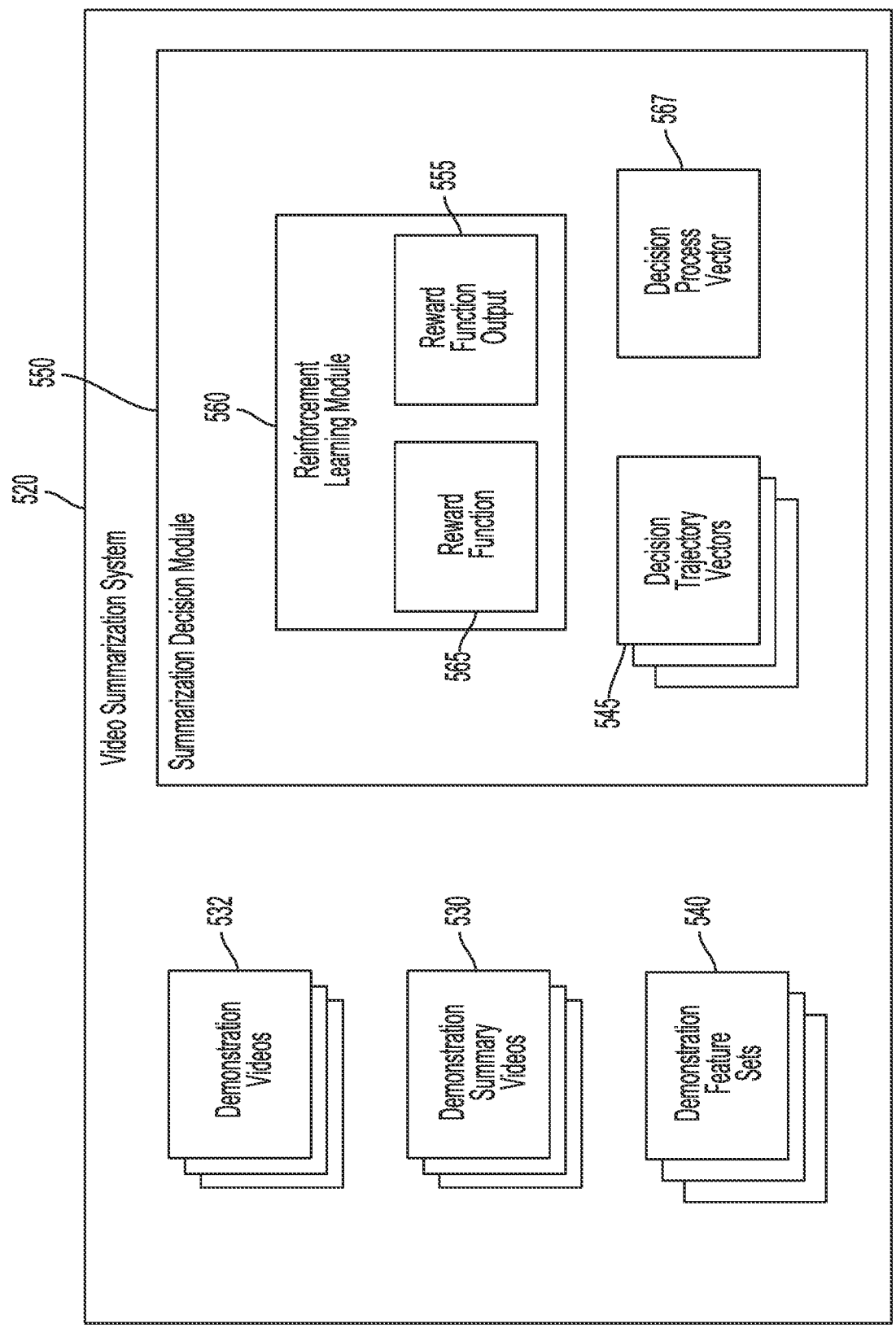
FIG. 5 is a diagram depicting an example of a video summarization system in which one or more of a summarization decision module or a reinforcement learning module are trained to generate a summarization feature set using a reward function, according to certain embodiments.

FIG. 5 depicts a video summarization system 520 in which one or more of a summarization decision module 550 or an RL module 560 are trained to generate a summarization feature set using a reward function 565. In some implementations, the reward function 565 is generated or modified during training of the modules 550 or 560. For example, the RL module 560 calculates parameter values by comparing training data to an output 555 of the reward function 565. Additionally or alternatively, the RL module 560 modifies the reward function 565 to include (or other modifications based on) the calculated parameter values. During training, the RL module 560 could repeat the calculations and comparisons, such as iterative modifications to the reward function 565 until the reward function output 555 is similar (e.g., within a training threshold) to the training data. In some cases, determining the similarity between the output 555 and the training data indicates that the trained reward function 565 (e.g., including modified parameter values) provides output that accurately matches the training data. Additionally or alternatively, determining the similarity between the output 555 and the training data indicates that the trained RL module 560 accurately generates a summarization feature set using the trained reward function 565. In some cases, one or more of the summarization decision module 550 or the RL module 560 are trained via an inverse reinforcement learning ("IRL") training technique, such as by applying the IRL technique to calculate the reward function 565. A non-limiting example of an IRL technique is maximum entropy inverse reinforcement learning ("MaxEnt IRL"), but other training techniques, including other IRL techniques, are possible.

In FIG. 5, the video summarization system 520 receives training data that includes one or more training sets of demonstration videos 532 and demonstration summary videos 530. For example, each one of the demonstration videos 532 is associated with a respective one of the demonstration summary videos 530. In some cases, the respective demonstration videos 532 and the associated demonstration summary videos 530 are identified as a training pair, e.g., each training pair including a particular demonstration video and a particular associated demonstration summary video. The demonstration videos 532 include digital video content, such as full-length videos, that is summarized by the demonstration summary videos 530. Additionally or alternatively, the demonstration summary videos 530 are expert demonstrations, such as summary videos generated by a human technician who is trained to generate summary videos for digital video content. In FIG. 5, the video summarization system 520 receives one or more demonstration feature sets 540, each one of the demonstration feature sets 540 being associated with a respective one of the demonstration videos 532, such as feature sets for shots of the respective demonstration video. In some cases, the demonstration feature sets 540 are received as training data, such as being received with the demonstration videos 532 and demonstration summary videos 530. Additionally or alternatively, the demonstration feature sets 540 are generated by one or more components of the video summarization system 520, such as a shot-splitting module or a feature-extraction neural network.

In some implementations, the summarization decision module 550 identifies a decision trajectory of one or more of the demonstration videos 532. Each decision trajectory indicates, for a particular demonstration video from the demonstration videos 532, a set of modification actions, e.g., decisions, that generate the demonstration summary video from the demonstration summary videos 530 that is associated with the particular demonstration video. For example, the summarization decision module 550 identifies, for each shot in the particular demonstration video, a particular modification action from a group of action options (e.g., "insert," "replace," "discard") that is applied to the shot to generate the associated demonstration summary video. Additionally or alternatively, the summarization decision module 550 generates a set of decision trajectory vectors 545, each one of the vectors 545 representing the decision trajectory for a respective one of the demonstration video 532. For example, and not by way of limitation, each of the decision trajectory vectors 545 can describe a Markov Decision Process that represents a particular paired demonstration video and associated demonstration summary video, e.g., a Markov Decision Process that selects shots from the demonstration video to generate the associated demonstration summary video. In some cases, the decision trajectory vectors 545 include values that represent the features sets for shots from the demonstration videos 532 and the modification action applied to the features sets to generate the demonstration summary videos 530. For instance, a particular one of the vectors 545 includes a value pair for each particular shot in the respective demonstration video, the value pair including a first value describing the feature set of the particular shot (e.g., a first vector of values representing features) and a second value describing the modification action applied to the particular shot (e.g., a second vector of values representing the modification action).

During training, the summarization decision module 550 calculates parameters of the reward function 565 by using the trajectories described in the decision trajectory vectors 545. In some cases, the summarization decision module 550 generates a decision process vector 567 that includes values of the parameters for the reward function 565. Additionally or alternatively, the summarization decision module 550 modifies one or more of the values in the decision process vector 567, such as iterative modifications during training. For example, an IRL technique is applied to the RL module 560 for calculation of the decision process vector 567. Additionally or alternatively, the decision process vector 567 is calculated by one or more neural networks, such as a deep neural network that is configured to identify parameters that relate a feature set of a video shot with a reward function. In some cases, the RL module 560 modifies the reward function 565 to use the parameter values of the decision process vector 567. The summarization decision module 550 applies the modified reward function 565 to one or more of the demonstration feature sets 540, such as feature sets for a training group of the demonstration videos 532. The summarization decision module 550 compares the reward function output 555 to features of the associated demonstration summary videos 530, e.g., the demonstration summary videos associated with the training group of the demonstration videos 532. For example, the summarization decision module 550 calculates differences between the output 555 and the features of the associated demonstration summary videos 530. The differences are compared to a training goal, such as a similarity threshold. If the comparison indicates sufficient similarity (e.g., the similarity threshold is fulfilled) between the output 555 and the features of the associated demonstration summary videos 530, the training is completed and the summarization decision module 550 can generate a summary video by applying the reward function 565 to an input video. If the comparison indicates insufficient similarity (e.g., the similarity threshold is not fulfilled) between the output 555 and the features of the associated demonstration summary videos 530, the summarization decision module 550 applies an additional iteration of the IRL technique to the RL module 560 or the reward function 565. During the additional iteration, the decision process vector 567 is recalculated, and the reward function 565 is modified to include the recalculated parameter values of the decision process vector 567. In some cases, the summarization decision module 550 applies multiple iterations of the IRL technique to the RL module 560, including sufficient iterations to fulfill the similarity threshold for the comparison between the output 555 and the features of the associated demonstration summary videos 530. In various embodiments, one or more of the summarization decision module 250 or the RL module 560 can be implemented as one or more of program code, program code executed by processing hardware (e.g., a programmable logic array, a field-programmable gate array, etc.), firmware, or some combination thereof.

In some implementations, a summarization decision module or an RL module, such as the summarization decision module 550 or the RL module 560, calculates a reward function, such as the reward function 565, by applying one or more rules-based operations. The rules-based operations include, for example, mathematical determinations of a decision trajectory vector, a decision process vector, parameters of a reward function, or other values applied by the summarization decision module or the RL module. Equations 1-8 describe non-limiting examples of rules-based operations for calculating optimized parameters for a reward function. Equation 1, for instance, describes a non-limiting example of a decision calculation for a video shot of an input video (including, without limitation, an input demonstration video for training).

$$s^t = (F_0^{t-1} \| f^t) \qquad \text{Eq. 1}$$

In Equation 1, a state $s^t$ is determined for a shot t from an input video, such as the input video 232 or a particular one of the demonstration videos 532. In some cases, the shot t is the shot being analyzed by a video summarization system, such as the candidate shot 235. In Equation 1, the value (or set of values) $f^t$ represents features of the shot t, such as the candidate feature set 245. In Equation 1, the summary vector $F_0^{t-1}$ includes a set of features, such as the summarization feature set 255, that are selected from previous evaluations of additional feature sets, such as additional feature sets evaluated from the shot feature sets 240.

In some implementations, Equation 1 describes a Markov Decision Process that is determined for the shot t from the input video. For example, the state $s^t$ is determined from a set of available modification actions (e.g., decisions from the Markov Decision Process). As a non-limiting example of available modification actions, the state $s^t$ is determined from a set of actions including $a_s$, in which the shot t is selected and inserted (e.g., appended) in the summary vector $F_0^{t-1}$, $a_d$, in which the shot t is discarded and the summary vector $F_0^{t-1}$ is not modified; or $a_e^i$, in which the shot t is selected to replace an evicted previous shot i from the summary vector $F_0^{t-1}$.

In some cases, a summarization feature set, such as the summarization feature set 255, is modified based on the state $s^t$ that is determined for each shot t from the input video. Equations 2a, 2b, and 2c (referred to herein as Equation 2) describe non-limiting example calculations to modify a state of the summary vector $F_0^{t-1}$, such as a modification selected from a set of available modification actions for a Markov Decision Process, as described above.

$$s^t \times a_s \rightarrow (\{\varsigma_0, \ldots \varsigma_k, \varsigma_t\} \| f^{t+1}) \qquad \text{Eq. 2a}$$

$$s^t \times a_d \rightarrow s^{t-1} \qquad \text{Eq. 2b}$$

$$s^t \times a_e^i \rightarrow (\{\varsigma_0, \ldots \varsigma_k, \varsigma_t\} - \{\varsigma_i\} \| f^{t+1}), \varsigma \in F_0^t \qquad \text{Eq. 2c}$$

In Equation 2, the summary vector $F_0^{t-1}$ includes a set of features $\{\varsigma_0, \ldots \varsigma_k\}$, where each of $\varsigma_0$ through $\varsigma_k$ represents a respective feature set selected during previous evaluations of candidate feature sets (e.g., feature sets of video shots selected for a summarization feature set). In Equation 2, the summary vector $F_0^{t-1}$ is modified to a subsequent summary vector $F_0^t$ by applying one of the modification actions $a_s$, $a_d$, or $a_e^i$. In Equation 2, the modification actions $a_s$, $a_d$, or $a_e^i$ are applied to the state $s^t$. With respect to Equation 2, the operator x indicates a state transition of the state $s^t$ according to the modification actions $a_s$, $a_d$, or $a_e^i$. As a non-limiting example, applying the modification actions $a_s$, $a_d$, or $a_e^i$ could include modifying a data structure (such as a vector) that represents the state $s^t$, such as by concatenating one or more values describing features of a video shot, or by removing one or more values describing features of a video shot. In some cases, operations for the concatenation or removal are determined based on the respective applied action $a_s$, $a_d$, or $a_e^i$. In Equation 2a, for example, the summary vector $F_0^{t-1}$ is modified by applying the action $a_s$ to the state $s^t$, such as by appending features of the shot t to the summary vector $F_0^{t-1}$ as a vector entry $\varsigma_t$ and providing the modified features $\{\varsigma_0, \ldots \varsigma_k, \varsigma_t\}$, to a subsequent iteration as features $f^{t+1}$ such as an iteration evaluating the shot t+1. In Equation 2b, the action $a_d$ is applied to the state $s^t$, such as by discarding the features of the shot t and providing the state $s^{t-1}$ to a subsequent iteration of Equation 2, such as an iteration evaluating a subsequent shot t+1. In Equation 2c, the summary vector $F_0^{t-1}$ is modified by applying the action $a_e^i$ to the state $s^t$, such as by appending features of the shot t to the summary vector $F_0^{t-1}$ as a vector entry $\varsigma_t$ and subtracting (e.g., evicting) a vector entry $\varsigma_i$ that includes features of the previous shot i. Additionally or alternatively, Equation 2c provides the modified features $\{\varsigma_0, \ldots \varsigma_k, \varsigma_t\}$ to a subsequent iteration as features $f^{t+1}$, such as an iteration evaluating the shot t+1.

In some cases, a decision trajectory vector, such as the decision trajectory vectors 545, is determined by applying Equation 2 to video shots of an input video, such as one or more of the demonstration videos 532. For example, a decision trajectory vector $\tau = \{s^0, a^0 \ldots s^t, a^t \ldots s^T, a^T\}$ is calculated for a set of T video shots, in which an action $a^t$ is determined for each state $s^t$, for a set of decisions $s^0$, $a^0$ through $s^T$, $a^T$. Additionally or alternatively, a Markov Decision Process can be identified by applying Equation 2 to an input video, such as a Markov Decision Process that identifies a modification action selected for each of the video shots.

In some implementations, a respective decision trajectory vector $\tau$ is determined for each video in a group of videos, such as the decision trajectory vectors 545 determined for the demonstration videos 532. Additionally or alternatively, parameters for a reward function are initialized (or modified) using the decision trajectory vector $\tau$, or a set of multiple decision trajectory vectors associated with multiple demonstration videos. Equation 3 describes a non-limiting example calculation to determine parameters of one or more reward functions, using a decision trajectory vector $\tau$.

$$R_\theta(\tau) = \Sigma_t r_\theta(s^t) = \Sigma_t \theta^T h^{s^t} \qquad \text{Eq. 3}$$

In Equation 3, the features of state $s^t$ are represented by $h^{s^t}$, such as a feature vector $h^{s^t}$. In Equation 3, a reward function $R_\theta$ is determined for a decision trajectory vector $\tau$, such as the reward function 565 determined for one or more of the decision trajectory vectors 545. Additionally or alternatively, a decision process vector $\theta$ is identified for the feature space of each shot t represented in the decision trajectory vector $\tau$. For example, the reward function $R_\theta$ is calculated as a summation of products, for each shot t, between the transposed decision process vector $\theta^T$ and the feature vector $h^{s^t}$. In some cases, the reward function $R_\theta$ is maximized, e.g., has a highest reward outcome, when the decision process vector $\theta$ includes parameter values such that the summed products of $\theta^T$ and $h^{s^t}$ are similar to the decision trajectory vector $\tau$.

In some cases, training a summarization decision module or an RL module, such as the summarization decision module 550 or the RL module 560, includes applying an IRL technique to a reward function. For example, an IRL technique is applied to train (or otherwise maximize) the reward function $R_\theta$, as described in regard to Equation 3. Equation 4 describes a non-limiting example of a calculation to determine a probability of obtaining the decision trajectory vector τ using the reward function $R_\theta$.

$$P(\tau) = \frac{1}{Z(\theta)} \exp R_\theta(\tau) \quad \text{Eq. 4}$$

In Equation 4, the probability P of the reward function $R_\theta$ producing the decision trajectory vector τ as an output is calculated as an exponential. For example, an IRL technique MaxEnt IRL assumes that the probability of a particular trajectory (e.g., vector τ) produced via an expert demonstration is exponential in the reward. In Equation 4, a partition function $Z(\theta)$ is a normalization factor. Equation 5 describes a non-limiting example of a calculation to determine a partition function, such as the partition function $Z(\theta)$.

$$Z(\theta) = \Sigma_{\tau \in D_{sample}} \exp R_\theta(\tau) \quad \text{Eq. 5}$$

In Equation 5, an exponential of the reward function $R_\theta$ is calculated for each decision trajectory vector τ in a set $D_{sample}$ of expert demonstrations, such as the decision trajectory vectors 545 for the group of demonstration summary videos 530. In Equation 5, the partition function $Z(\theta)$ is calculated as a summation of the exponentials of the reward functions $R_\theta$ across the set $D_{sample}$ of expert demonstrations. In some cases, determining the decision trajectory vector τ as a sequence of modification actions selected from a small set of available modification actions (e.g., "insert," "replace," "discard") allows improved efficiency in calculating the partition function $Z(\theta)$, such as completing the calculation with a reduced expenditure of computational resources. For example, generating the decision trajectory vector τ as a Markov Decision Process, in which the state for each shot t is identified from a deterministic set of modification options, allows more efficient calculation of the partition function $Z(\theta)$.

In some implementations, a summarization decision module or an RL module that determines a reward function optimizes the reward function to produce output, such as a set of selected feature sets, that is similar to a training set of expert demonstrations. For example, the RL module 560 (or a sub-component thereof) trains the reward function 565 to produce output 555 that is similar to features of the demonstration summary videos 530. In some cases, the reward function is optimized to include parameters, such as the decision process vector 567, that maximize a likelihood of the reward function producing output similar to an expert demonstration. Each of Equation 6 and Equation 7 describes a non-limiting example of a calculation to maximize a probability of a reward function producing output similar to an expert demonstration. In some cases, Equation 6 can be rewritten in the form used by Equation 7.

$$\max_\theta L(\theta) = \max_\theta \sum_{\tau \in D} \log P_{r\theta}(\tau) \quad \text{Eq. 6}$$

$$\max_\theta L(\theta) = \sum_{\tau \in D} R_\theta(\tau) - M \log\left(\sum_{\tau \in D} \exp R_\theta(\tau)\right) \quad \text{Eq. 7}$$

In Equations 6 and 7, a maximum likelihood $$\max_\theta L(\theta)$$

is calculated for the decision process vector θ. In Equation 6, the maximum likelihood $$\max_\theta L(\theta)$$

is calculated as a summation of the logarithm of probabilities $P_{r\theta}(\tau)$ across the set D of expert demonstrations. The probability $P_{r\theta}(\tau)$ is a probability of obtaining the decision trajectory vector τ using a particular reward function $r_\theta$, such as generally described in regards to Equation 4. In Equation 7, the maximum likelihood $$\max_\theta L(\theta)$$

is calculated as a difference between first and second terms. The first term in Equation 7 includes a summation of reward functions $R_\theta$ across the set D of expert demonstrations. The second term in Equation 7 includes the quantity M of expert demonstrations in the set D, multiplied by the logarithm of the summation of reward functions $R_\theta$ across the set D.

Equation 8 describes a non-limiting example of a calculation to optimize a reward function for producing output similar to an expert demonstration. In some cases, a summarization decision module or an RL module that optimizes a reward function, such as during training, applies Equation 8 to a reward function to determine an optimized set of parameters for the reward function.

$$\nabla_\theta L(\theta) = \Sigma_{\tau \in D} \Sigma_{t \in \tau} h^{s^ت} - M \Sigma_{\tau \in D} \Sigma_{t \in \tau} P(s^t | \theta) h^{s^t} \quad \text{Eq. 8}$$

In Equation 8, a gradient descent $\nabla_\theta L(\theta)$ is calculated for a likelihood $L(\theta)$ of the reward function, which has parameters from the decision process vector θ, producing output similar to an expert demonstration. The gradient descent $\nabla_\theta L(\theta)$ is calculated as a difference between first and second terms. The first term in Equation 8 includes a summation of the feature vector $h^{s^t}$ across the decision trajectory vectors τ included in the set D of expert demonstrations and across the shots t included in each particular decision trajectory vector τ. The second term in Equation 8 includes a product of the feature vector $h^{s^t}$ multiplied by a probability $P(s^t|\theta)$ for visiting the state $s^t$ given a reward function parameterized by the decision process vector θ. In Equation 8, the second term also includes the quantity M of expert demonstrations in the set D, multiplied by a summation of the product of the feature vector $h^{s^t}$ and the probability $P(s^t|\theta)$, where the summation is across the decision trajectory vectors τ included in the set D of expert demonstrations and across the shots t included in each particular decision trajectory vector τ. In some cases, a reward function optimized via Equation 8, such as the reward function 565, provides an output that is similar to expert demonstrations, such as the output 555 as compared to features of the demonstration summary videos 530.

In some embodiments, a neural network, or a combination of neural networks, is trained to perform one or more operations related to generating a reward function. For example, and not by way of limitation, a deep neural network could be configured to optimize a reward function or to identify parameters that relate a feature set of a video shot with a reward function. For instance, a deep neural network could be trained to perform one or more operations generally described in regards to Equations 1-8.

Figure 6:
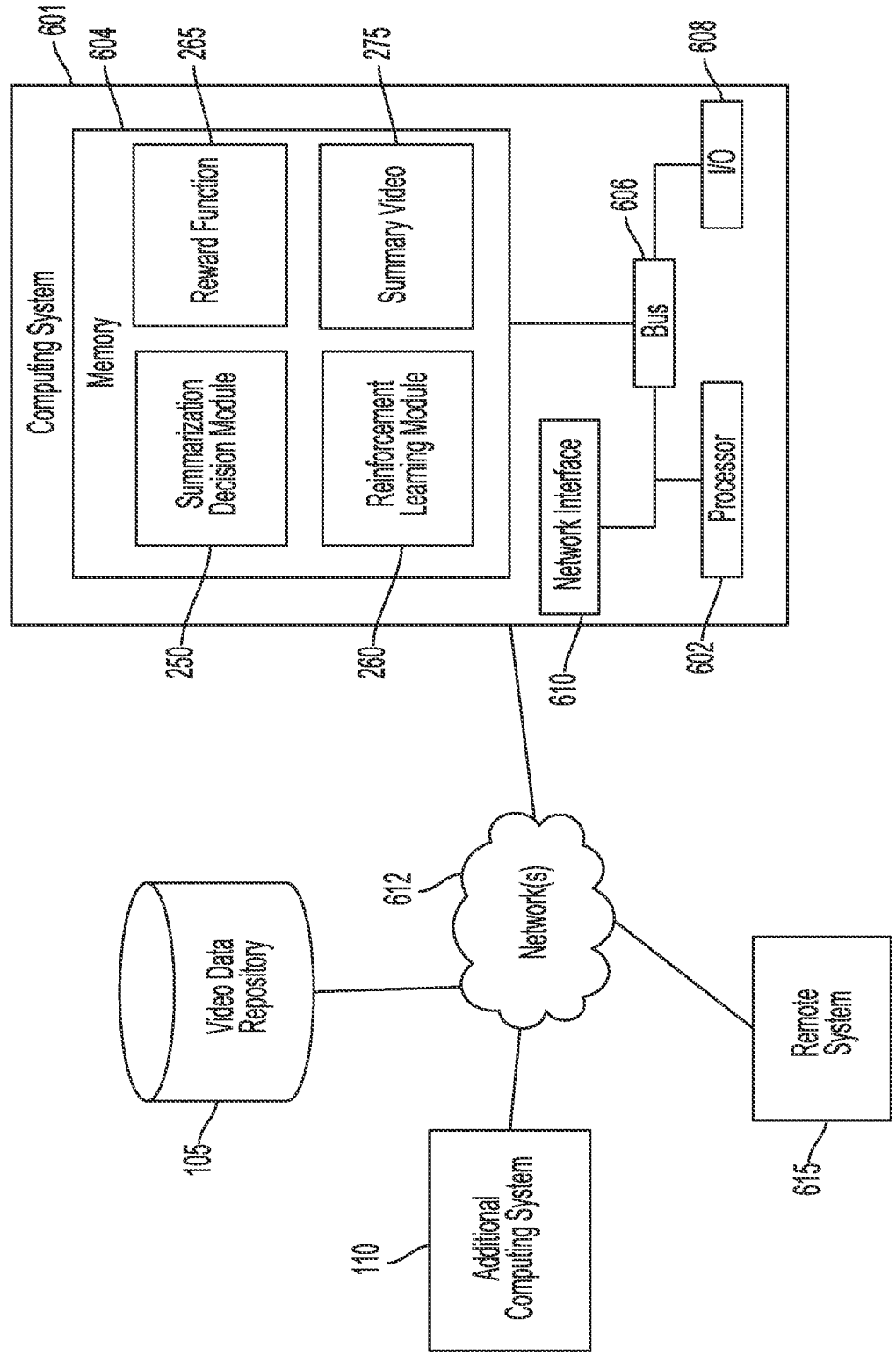
FIG. 6 is a block diagram depicting an example of a computing system for implementing a video summarization system configured to generate a domain-specific summary video, according to certain embodiments.

Any suitable computing system or group of computing systems can be used for performing the operations described herein. For example, FIG. 6 is a block diagram depicting a computing system configured to implement a video summarization system capable of generating domain-specific summary videos, according to certain embodiments.

The depicted example of a computing system 601 includes one or more processors 602 communicatively coupled to one or more memory devices 604. The processor 602 executes computer-executable program code or accesses information stored in the memory device 604. Examples of processor 602 include a microprocessor, an application-specific integrated circuit ("ASIC"), a field-programmable gate array ("FPGA"), or any other suitable processing device. The processor 602 can include any number of processing devices, including one.

The memory device 604 includes any suitable non-transitory computer-readable medium for storing the summarization decision module 250, the RL module 260, the reward function 265, the summary video 275, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a read-only memory ("ROM"), a random-access memory ("RAM"), an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 601 may also include a number of external or internal devices such as input or output devices. For example, the computing system 601 is shown with an input/output ("I/O") interface 608 that can receive input from input devices or provide output to output devices. A bus 606 can also be included in the computing system 601. The bus 606 can communicatively couple one or more components of the computing system 601.

The computing system 601 executes program code that configures the processor 602 to perform one or more of the operations described above with respect to FIGS. 1-5. The program code includes operations related to, for example, one or more of the summarization decision module 250, the RL module 260, the reward function 265, the summary video 275, or other suitable applications or memory structures that perform one or more operations described herein. The program code may be resident in the memory device 604 or any suitable computer-readable medium and may be executed by the processor 602 or any other suitable processor. In some embodiments, the program code described above, the summarization decision module 250, the RL module 260, the reward function 265, and the summary video 275 are stored in the memory device 604, as depicted in FIG. 6. In additional or alternative embodiments, one or more of the summarization decision module 250, the RL module 260, the reward function 265, the summary video 275, and the program code described above are stored in one or more memory devices accessible via a data network, such as a memory device accessible via a cloud service.

The computing system 601 depicted in FIG. 6 also includes at least one network interface 610. The network interface 610 includes any device or group of devices suitable for establishing a wired or wireless data connection to one or more data networks 612. Non-limiting examples of the network interface 610 include an Ethernet network adapter, a modem, and/or the like. A remote system 615 is connected to the computing system 601 via network 612, and remote system 615 can perform some of the operations described herein, such as splitting video shots or extracting video features. The computing system 601 is able to communicate with one or more of the remote computing system 615, the video data repository 105, or the additional computing system 110 using the network interface 610. Although FIG. 6 depicts the video data repository 105 as connected to computing system 601 via the networks 612, other embodiments are possible, including the video data repository 105 running as a program or a data structure in the memory 604 of computing system 601.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," "identifying," or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of generating a summary video of digital video data, the method comprising:
    generating a concatenated feature set by combining: (i) a feature set of a candidate video shot that is included in a group of multiple video shots, and (ii) additional feature sets that are included in a summarization feature set, wherein the additional feature sets are associated with additional video shots selected from the group of multiple video shots;
    calculating multiple action options of a reward function that is applied to the concatenated feature set, the reward function being included in a trained reinforcement learning ("RL") module, the multiple action options describing a group of modification actions, the reward function including decision process vector parameters that relate the multiple action options to the concatenated feature set;
    determining a reward outcome that is included the multiple action options, wherein the reward outcome indicates, from the group of modification actions, a particular modification of the summarization feature set;
    modifying, responsive to determining the reward outcome, the summarization feature set to include the feature set of the candidate video shot by applying the particular modification indicated by the reward outcome;
    identifying one or more video frames associated with the modified summarization feature set; and
    generating a summary video based on the identified video frames.

2. The method of claim 1, further comprising:
    wherein the particular modification indicated by the reward outcome includes at least one of:
        a first modification responsive to determining that the reward outcome is a first action outcome included in the multiple action options, or
        a second modification responsive to determining that the reward outcome is a second action outcome included in the multiple action options.

3. The method of claim 2, wherein:
    the first modification comprises including, in the summarization feature set, the feature set of the candidate video shot concatenated with the additional feature sets associated with the additional video shots, and
    the second modification includes removing, from the summarization feature set, a particular feature set of a particular one of the additional video shots.

4. The method of claim 1, further comprising:
    generating, for each video frame included in the digital video data, a sequence identification score describing visual features of the video frame;
    calculating, for each video frame included in the digital video data, a difference between the sequence identification score of the video frame and an additional sequence identification score of a subsequent video frame included in the digital video data; and
    determining, for each video frame included in the digital video data, that the video frame and the subsequent video frame are included in a particular video shot of the group of multiple video shots, wherein the determination is based on a comparison of the difference to a shot threshold.

5. The method of claim 1, further comprising:
    extracting, from the candidate video shot, one or more of visual features or audible features; and
    modifying the feature set of the candidate video shot to include the one or more of the visual features or the audible features.

6. The method of claim 1, further comprising:
    identifying, for the candidate video shot, a classification label; and
    modifying the feature set of the candidate video shot to include the classification label.

7. A system for generating a summary video of digital video data, the system comprising:
    a summarization decision module for generating a summarization feature set by applying a reward function to a group of multiple video shots,
        the reward function included in a trained reinforcement learning ("RL") module,
        the reward function including decision process vector parameters;
    the summarization decision module configured for:
        receiving a feature set of a candidate video shot that is included in the group of multiple video shots;
        concatenating the feature set of the candidate video shot with additional feature sets that are included in the summarization feature set, the additional feature sets associated with additional video shots selected from the group of multiple video shots;
        determining, by applying the reward function to the concatenated feature sets, a reward outcome of the reward function, wherein the decision process vector parameters relate the reward outcome to the concatenated feature set, wherein the reward outcome indicates a particular modification of the summarization feature set; and
        modifying, responsive to the reward outcome and by applying the particular modification indicated by the reward outcome, the summarization feature set to include the feature set of the candidate video shot; and
    a video-editing module configured for:
        identifying one or more video frames associated with the modified summarization feature set; and
        generating a summary video based on the identified video frames.

8. The system of claim 7, wherein the trained RL module is configured for:
    calculating multiple action options of the reward function, the multiple action options describing a group of modification actions available to the trained RL module, wherein the reward outcome is included in the multiple action options, wherein modifying the summarization feature set includes at least one of:
  a first modification responsive to determining that the reward outcome is a first action option included in the multiple action options, or
  a second modification responsive to determining that the reward outcome is a second action option included in the multiple action options.

9. The system of claim 8, wherein:
the first modification comprises including, in the summarization feature set, the feature set of the candidate video shot concatenated with the additional feature sets associated with the additional video shots, and
the second modification includes removing, from the summarization feature set, a particular feature set of a particular one of the additional video shots.

10. The system of claim 7, further comprising a video-splitting module for generating the group of multiple video shots, the video-splitting module configured for:
  generating, for each video frame included in the digital video data, a sequence identification score describing visual features of the video frame;
  calculating, for each video frame included in the digital video data, a difference between the sequence identification score of the video frame and an additional sequence identification score of a subsequent video frame included in the digital video data; and
  determining, for each video frame included in the digital video data, that the video frame and the subsequent video frame are included in a particular video shot of the group of multiple video shots, wherein the determination is based on a comparison of the difference to a shot threshold.

11. The system of claim 7, wherein the generated summary video is provided to one or more of: a video publishing system, a video archive system, or a video search-and-retrieval system.

12. The system of claim 7, further comprising a feature-extraction neural network configured for:
  extracting, from the candidate video shot, one or more of visual features or audible features; and
  modifying the feature set of the candidate video shot to include the one or more of the visual features or the audible features.

13. The system of claim 7, further comprising a classification neural network configured for:
  identifying, for the candidate video shot, a classification label; and
  modifying the feature set of the candidate video shot to include the classification label.

14. The system of claim 13, wherein the classification neural network is further configured for:
  receiving a value for a domain-specific classification parameter, wherein the domain-specific classification parameter is identified based on a characteristic of a domain of the candidate video shot; and
  initializing an additional classification parameter based on the received value.

15. A non-transitory computer-readable medium embodying program code for generating a reward function to summarize digital video data, the program code comprising instructions which, when executed by a processor, cause the processor to perform operations comprising:
  receiving a training pair including a demonstration video and a demonstration summary video;
  the demonstration video including a set of video shots and the demonstration summary video including a subset of the video shots from the demonstration video;
  generating a decision trajectory vector for the demonstration video, the decision trajectory vector indicating a set of modification actions to generate the demonstration summary video from the demonstration video;
  calculating a decision process vector indicating a parameter value that relates a respective feature set of each video shot in the demonstration video with a corresponding one of the modification actions for the each video shot; and
  modifying a reward function to include the parameter value, wherein applying the modified reward function to an input video generates a summary video.

16. The non-transitory computer-readable medium of claim 15, the operations further comprising:
  generating a concatenated feature set for the input video by combining multiple feature sets of multiple video shots from the input video;
  applying the modified reward function to the concatenated feature set for the input video; and
  modifying a summarization feature set responsive to a reward outcome of the modified reward function.

17. The non-transitory computer-readable medium of claim 16, wherein the set of modification actions includes:
  a first modification that comprises concatenating a candidate feature set of a candidate video shot with additional feature sets of additional video shots, and
  a second modification that comprises removing, from the additional feature sets of the additional video shots, a particular feature set of a particular one of the additional video shots.

18. The non-transitory computer-readable medium of claim 15, wherein the decision trajectory vector is generated via a Markov Decision Process.

19. The non-transitory computer-readable medium of claim 15, wherein the decision trajectory vector includes at least one value indicating features of the each video shot and at least one value representing the corresponding modification action for the each video shot.

20. The non-transitory computer-readable medium of claim 15, wherein the decision process vector is calculated via inverse reinforcement learning.

* * * * *